US009003439B2

(12) United States Patent
DaCosta

(10) Patent No.: US 9,003,439 B2
(45) Date of Patent: *Apr. 7, 2015

(54) SYSTEM AND METHOD FOR INTERNET TV AND BROADCAST ADVERTISEMENTS

(71) Applicants: Sony Corporation, Tokyo (JP); Sony Electronics Inc., Park Ridge, NJ (US)

(72) Inventor: Behram Mario DaCosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/290,636

(22) Filed: May 29, 2014

(65) Prior Publication Data

US 2014/0282635 A1 Sep. 18, 2014

Related U.S. Application Data

(63) Continuation of application No. 11/563,446, filed on Nov. 27, 2006, now Pat. No. 8,776,107.

(51) Int. Cl.
*H04N 7/10* (2006.01)
*H04N 7/025* (2006.01)
(Continued)

(52) U.S. Cl.
CPC .......... *H04N 21/2668* (2013.01); *H04H 60/63* (2013.01); *H04N 7/163* (2013.01); *H04N 21/25435* (2013.01); *H04N 21/4532* (2013.01);
(Continued)

(58) Field of Classification Search
CPC ........... H04N 21/254; H04N 21/2547; H04N 21/2668; H04N 21/26241; H04N 21/23617; H04N 21/488

USPC ............ 725/2, 32, 34, 35, 36, 51; 705/14.52, 705/26.1, 26, 7
See application file for complete search history.

(56) References Cited

U.S. PATENT DOCUMENTS 5,724,521 A * 3/1998 Dedrick ................ 705/26.1
6,067,564 A 5/2000 Urakoshi
(Continued)

FOREIGN PATENT DOCUMENTS

WO 0122731 A1 3/2001
WO 06064224 A1 6/2006

OTHER PUBLICATIONS

Christian, Patrick, "Addressable IPTV Advertising: Dramatically Increasing Advertising Revenue per Viewer", http://www.iptvarticles.com/iptvmagzine_2005_10_addressable_iptv_advertising.htm, Oct. 30, 2006, 9 pages.
Minerva Networks, "Product Overview", http://www.minervanetworks.com/Products_overview.htm, Oct. 30, 2006, 2 pages.

*Primary Examiner* — Nasser Goodarzi
*Assistant Examiner* — An Nguyen
(74) *Attorney, Agent, or Firm* — John P. O'Banion

(57) ABSTRACT

A system and method for providing targeted advertising messages to a user, in particular users viewing Internal TV or broadcast programs. Advertising data files from one or more advertising entities are stored in a centralized location, such as a server or similar platform. Data relating to the user is acquired from the user's device settings and/or identification, so that a targeted advertising message may be selected from one of the stored advertising data files. The content data is transmitted to the user, the data having a cue for insertion of the selected targeted advertising message prior to or after the content file has been transferred.

26 Claims, 5 Drawing Sheets

(51) Int. Cl.

| | | |
|---|---|---|
| *H04N 21/2668* | (2011.01) | |
| *H04H 60/63* | (2008.01) | |
| *H04N 7/16* | (2011.01) | |
| *H04N 21/2543* | (2011.01) | |
| *H04N 21/45* | (2011.01) | |
| *H04N 21/466* | (2011.01) | |
| *H04N 21/61* | (2011.01) | |
| *H04N 21/81* | (2011.01) | |
| *H04N 21/234* | (2011.01) | |
| *H04N 21/2547* | (2011.01) | |
| *H04N 21/258* | (2011.01) | |
| *H04N 21/2665* | (2011.01) | |
| *H04H 20/10* | (2008.01) | |
| *H04H 60/45* | (2008.01) | |
| *H04H 60/51* | (2008.01) | |

(52) U.S. Cl.
CPC ....... *H04N 21/4667* (2013.01); *H04N 21/6125* (2013.01); *H04N 21/812* (2013.01); *H04N 21/23424* (2013.01); *H04N 21/2547* (2013.01); *H04N 21/25883* (2013.01); *H04N 21/2665* (2013.01); *H04H 20/10* (2013.01); *H04H 60/45* (2013.01); *H04H 60/51* (2013.01)

(56) References Cited

U.S. PATENT DOCUMENTS

| | | | |
|---|---|---|---|
| 6,324,519 B1 * | 11/2001 | Eldering | 705/14.66 |
| 6,442,529 B1 | 8/2002 | Krishan et al. | |
| 6,574,793 B1 | 6/2003 | Ngo et al. | |
| 7,370,073 B2 | 5/2008 | Yen | |
| 7,979,308 B2 * | 7/2011 | Ho et al. | 705/14.7 |
| 8,776,107 B2 | 7/2014 | Dacosta | |
| 2001/0014969 A1 * | 8/2001 | Seki | 725/1 |
| 2001/0042064 A1 | 11/2001 | Davis et al. | |
| 2002/0083442 A1 * | 6/2002 | Eldering | 725/34 |
| 2002/0095330 A1 * | 7/2002 | Berkowitz et al. | 705/14 |
| 2002/0123928 A1 * | 9/2002 | Eldering et al. | 705/14 |
| 2002/0124219 A1 | 9/2002 | Kuroki | |
| 2002/0124249 A1 | 9/2002 | Shintani et al. | |
| 2002/0178447 A1 * | 11/2002 | Plotnick et al. | 725/36 |
| 2003/0005445 A1 | 1/2003 | Schein et al. | |
| 2003/0065805 A1 | 4/2003 | Barnes | |
| 2003/0221191 A1 | 11/2003 | Khusheim | |
| 2003/0225629 A1 * | 12/2003 | Banks et al. | 705/26 |
| 2004/0107125 A1 | 6/2004 | Guheen et al. | |
| 2005/0246736 A1 * | 11/2005 | Beyda et al. | 725/35 |
| 2007/0208751 A1 * | 9/2007 | Cowan et al. | 707/10 |
| 2007/0276925 A1 * | 11/2007 | La Joie et al. | 709/219 |
| 2008/0270417 A1 * | 10/2008 | Roker | 707/10 |

* cited by examiner

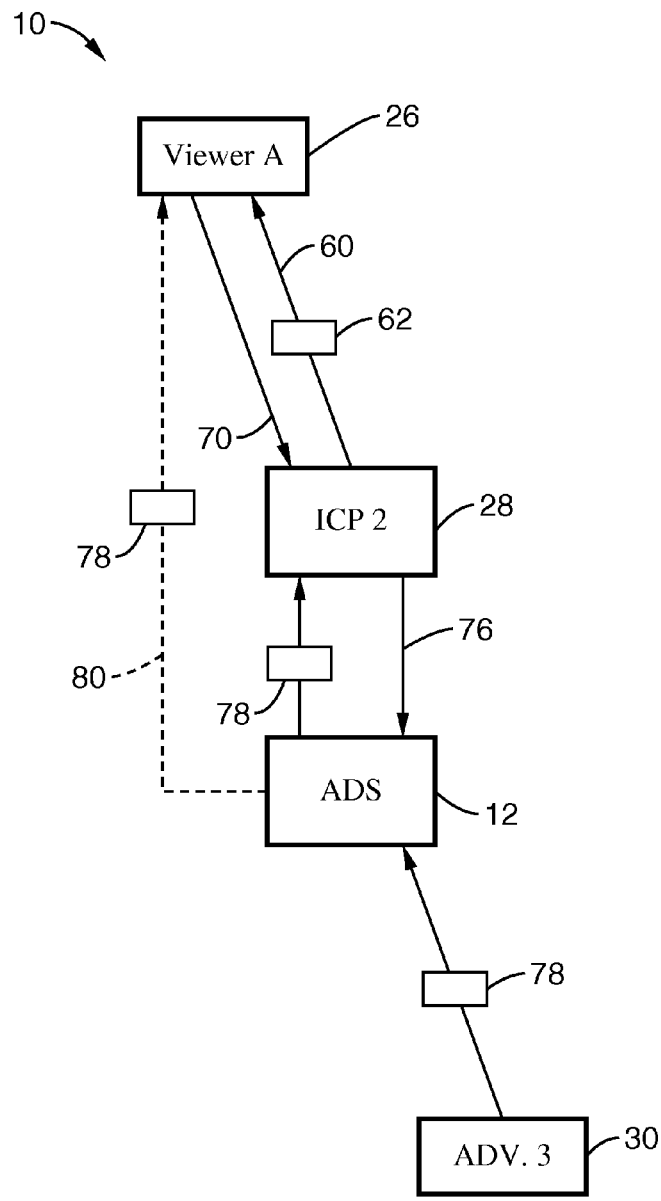
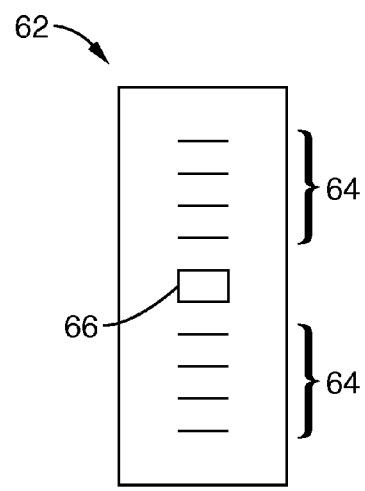
FIG. 3
FIG. 4

SYSTEM AND METHOD FOR INTERNET TV AND BROADCAST ADVERTISEMENTS

CROSS-REFERENCE TO RELATED APPLICATIONS

This application is a continuation of U.S. patent application Ser. No. 11/563,446 filed on Nov. 27, 2006, incorporated herein by reference in its entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to media advertising, and more particularly to advertising for media content distributed over the Internet and broadcast channels.

2. Description of Related Art

At any given time, a number of viewers may be viewing content from any one of a number of internet TV content providers. For example, a first viewer may be located in San Diego, and viewing Internet TV content over his or her computer. Generally, Internet TV refers to video programming that is viewed over the public Internet. The viewer may be viewing video content from any number of internet TV content providers, including providers located in different countries. For example, the viewer may be viewing content from an Internet site in Slovenia. This content may be streamed to the viewer, or may have been pre-downloaded to the viewer's device (e.g. computer, TV, cell phone, etc.), or to local storage connected to viewer's device. The Internet site in Slovenia may be owned, operated, and/or partnered with, for example, a Slovenian television station that stores contents of it's terrestrial TV broadcasts in Slovenia. Generally the content is adapted for viewing or downloading on the Internet (e.g. using MPEG packets that are encapsulated in IP prior to being transmitted over the Internet, and the content being offered at different data rates suitable for different Internet bandwidths, etc.).

Currently, there is a lack of a reliable revenue structure and business model for the Internet site as described above. Generally, the Internet service does not increase loyalty or viewers for the Slovenian television station's terrestrial broadcast service, since viewers such as the San Diego viewer do not have access to the terrestrial broadcasts in Slovenia. Also, advertisements that may have been broadcast with the original terrestrial content in Slovenia will typically not be relevant to international viewers such as the San Diego viewer and hence the Slovenian television station, is unlikely to be paid by advertisers for this exposure over the Internet. Other methods of getting revenue for the station's Internet site, such as subscription or pay-per-view from each viewer, may not be palatable to viewers who wish to briefly watch contents from many different sources on the Internet without making any financial commitments to any single source.

While broadcast transmissions (e.g. cable or satellite) do have a revenue or business model (e.g. cable/satellite subscriptions and general advertising), targeted advertisements cannot be currently implemented cost effectively for broadcast content. For example when ABC (or like station) broadcasts its evening news, it may include nationally relevant advertising ("commercials"), or it may depend on its local affiliates to insert local advertising during over-the-air (OTA) broadcast. However, neither ABC nor the local affiliate may insert different advertising for different viewers in the same affiliate location that are watching the same program. Therefore, the effectiveness of the advertisements, and hence the ROI for advertisers and payment from advertisers to content deliverers, is low.

Therefore, an object of the present invention is to provide a new business model and system for generating advertising revenue for Internet TV content. Another object is a business and revenue model for generating targeted advertising placement in broadcast transmissions. At least some of these objectives will be met in the following description.

BRIEF SUMMARY OF THE INVENTION

An aspect of the invention is a method for providing targeted advertising messages to a user. The method includes the steps of storing a plurality of advertising data files from one or more advertising entities, collecting user data relating to the user, selecting a targeted advertising message from one of the stored advertising data files, and transmitting content data to the user, the content data having a cue for insertion of data relating to the selected targeted advertising message.

In a preferred embodiment, the plurality of advertising data files are stored in a centralized location e.g. a platform or server of an advertising distribution service (ADS).

In some embodiments, the transferred content data comprises an Internet TV program from an internet content provider. However, the method may also be used for transmitting a broadcast program to a set top box of the user. Alternative media content, such as audio (e.g. Internet radio) and picture files may also be exchanged.

In many cases, the collected user data related to the user comprises acquiring demographic data about the user. The demographic data may be acquired from the user's device, e.g. from the configuration data stored on a computer, or data stored on a set-top-box (STB) or like device.

In one embodiment, the insertion of data relating to the selected targeted advertising message is performed prior to transmission of the content to the user. Alternatively, the insertion of data relating to the selected targeted advertising message is performed after transmission of the content to the user.

In a further embodiment, data relating to one or more advertiser preferences is stored, such that the advertiser preferences are used in the selection of the targeted advertising message.

Generally, content is transmitted to the user through one of a plurality of content providers. In addition, data relating to one or more content providers can be stored for use in the selection of the targeted advertising message.

Another aspect of the invention is a system for providing targeted advertising messages to a user. The system includes a database comprising a plurality of advertising data files from one or more advertising entities, and a network connection linking the database with the plurality of content providers. The database is configured to allow transmission of one of the advertising data files to a targeted user seeking transmission of content from one of the plurality of content providers. The selected advertising data file is transmitted through the content provider to the targeted user based on user data relating to the user.

In one embodiment of the current aspect, the database also comprises user data relating to one or more users, wherein the user data is used for selection of the advertising data file. The user data may comprise demographic data collected from the user, which may be used for selection of the advertising data file. For example, only users having a geographic location specified by a particular advertiser will receive that advertiser's ad.

Preferably, the advertising data file is configured to be inserted at a cued location in the transmitted content. The advertising data file may be configured such that it is inserted prior to or after transmission of the content to the user.

In another embodiment, the database further comprises advertiser data relating to the plurality of advertisers, wherein the advertiser data may be used for selection of the advertising data file.

In yet another embodiment, the database further comprises content provider data relating to the plurality of content providers, wherein the content provider data is used for selection of the advertising data file.

A further aspect is a method for providing broadcast content to a user viewing the broadcast content via a receiving device (e.g. STB, satellite receiver, etc.). The method includes the steps of acquiring viewer data relating to the viewer from the receiving device, identifying one or more sources of a content item selected by the viewer, selecting a source for the content item as a function of the acquired viewer data, and downloading the content item to the viewer.

In a preferred embodiment, acquiring viewer data comprises identifying the user's receiving device, and retrieving viewer data stored on the receiving device. Information such as the geographic location of the viewer or viewing history of the viewer may be obtained.

In one embodiment, selecting a source for the content item comprises negotiating the best pay-per-view rate from the one or more sources. The pay-per-view rate may be a function of the value of the viewer to an advertiser, as obtained from the acquired viewer data.

In yet another embodiment, downloading the content item comprises selecting an advertising data file for insertion at a cued location in the content item, and downloading the advertising file and content item to the viewer.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 3. illustrates an exemplary interaction between the ADS of the present invention and a content provider, advertiser, and end user or viewer.

FIG. 4 illustrates a content data file with cue location for advertising.

Figure 5:
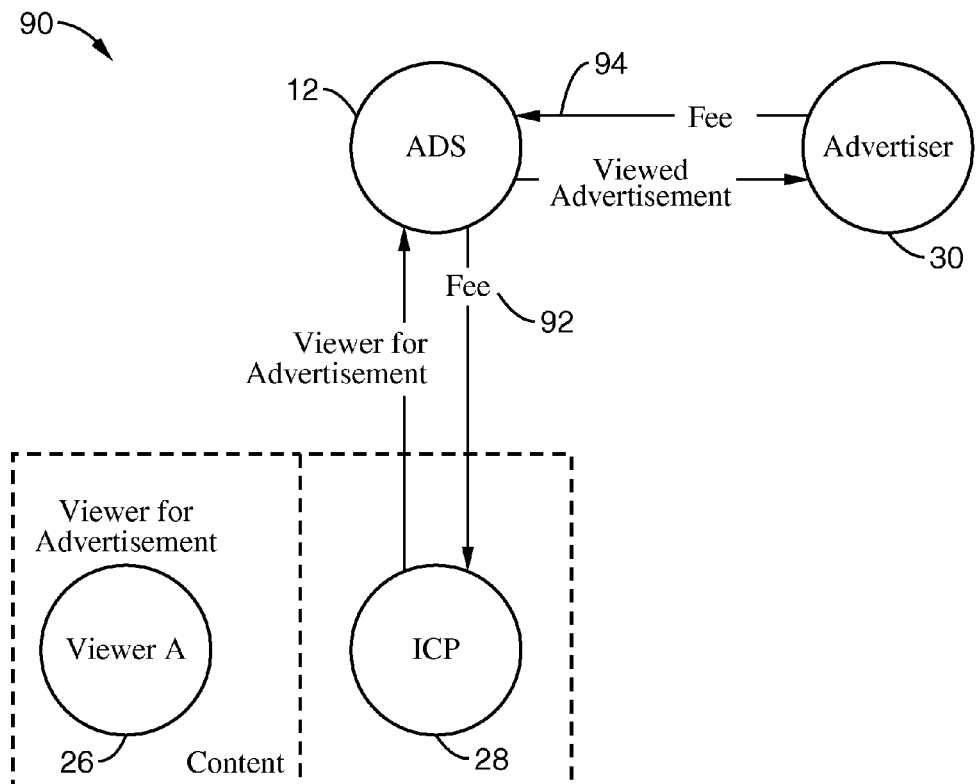

FIG. 5 is a diagram of a revenue model for an ADS in accordance with the present invention.

Figure 6:
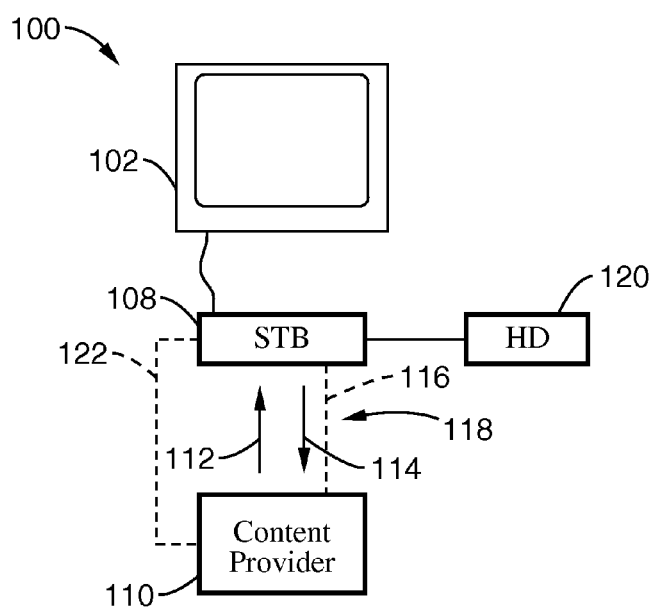

FIG. 6 is a diagram of an advertising revenue system for broadcast media.

Figure 7:
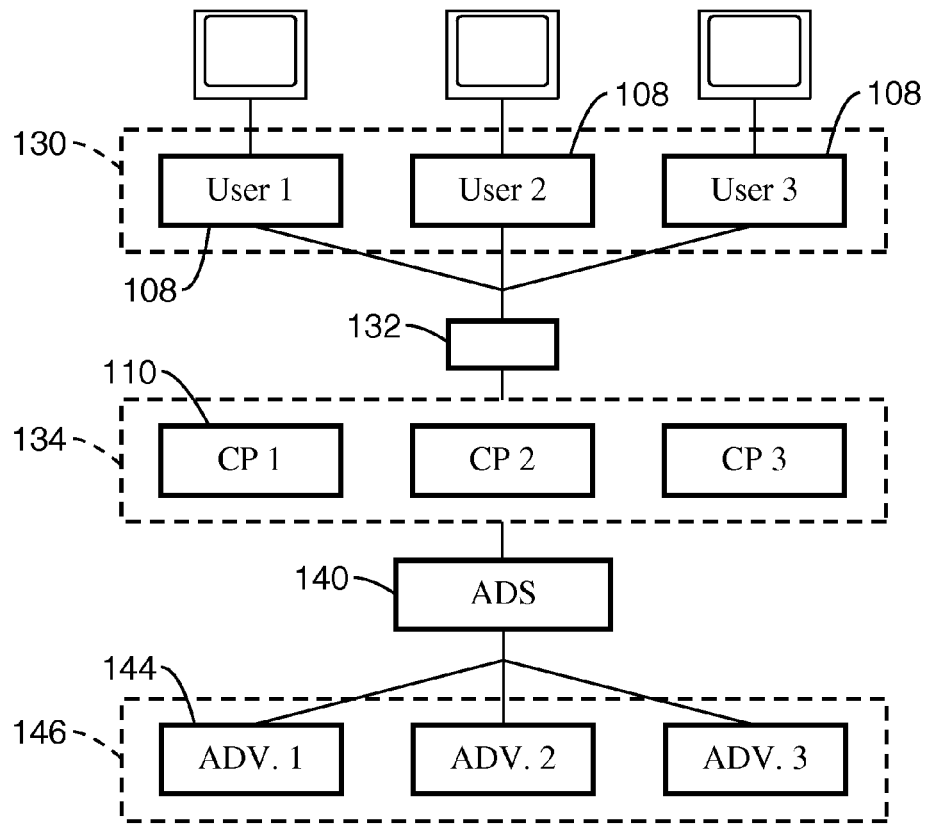

FIG. 7 is a diagram of a broadcast system incorporating an ADS.

Figure 8:
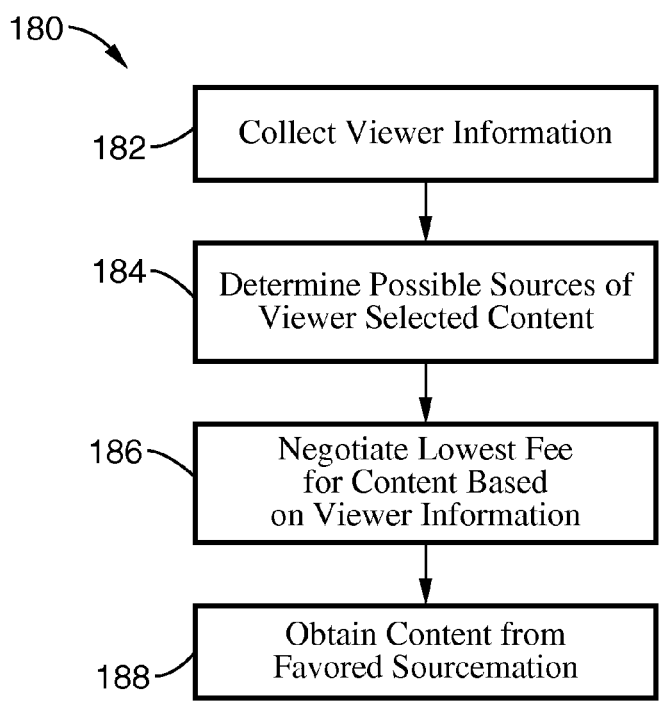

FIG. 8 illustrates a flowchart for providing targeted advertising to broadcast viewer in accordance with the present invention.

DETAILED DESCRIPTION OF THE INVENTION

Referring more specifically to the drawings, for illustrative purposes the present invention is embodied in the apparatus generally shown in FIG. 1 through FIG. 8. It will be appreciated that the apparatus may vary as to configuration and as to details of the parts, and that the method may vary as to the specific steps and sequence, without departing from the basic concepts as disclosed herein.

Figure 1:
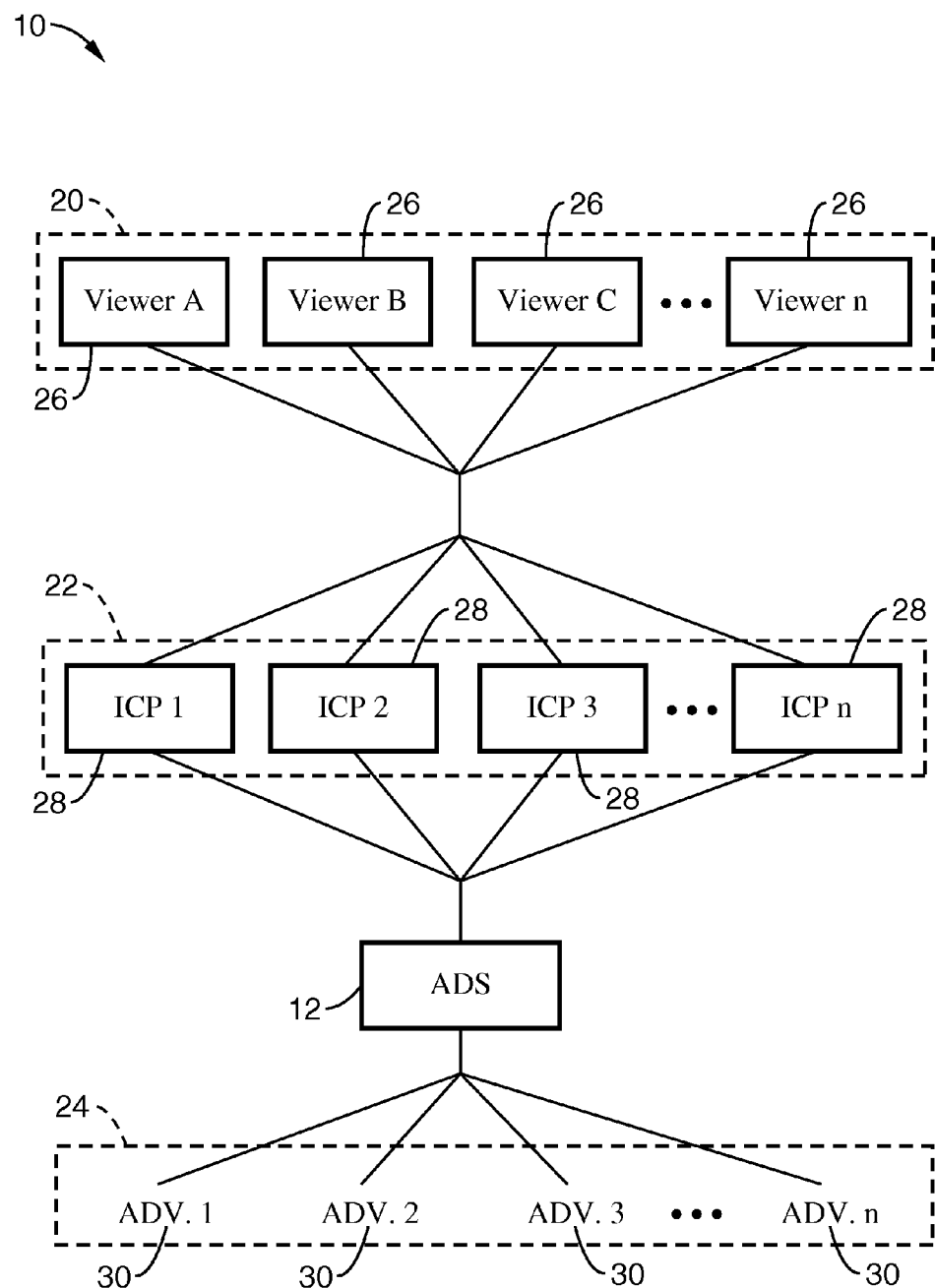
FIG. 1 is a diagram illustrating an Advertising Distribution Service (ADS) linking content providers with viewers in accordance with the present invention.

FIG. 1 illustrates a system 10 in accordance with the present invention utilizing an Internet-based service, e.g. an advertisement distribution service (ADS) 12, for linking content providers with advertisers and users (e.g. viewers). As shown in FIG. 1, a viewer pool 20 of individual viewers 26 (e.g. viewer A, viewer B, viewer C, etc.) may at any time be seeking or viewing content from a content provider pool 22 of one or more Internet content providers (ICPs) 28 (e.g. ICP1, ICP2, ICP3, etc.).

The individual ICPs 28 may transmit content (e.g. broadcast, multicast or unicast) in various formats, including streaming video for Internet TV, or even audio content for Internet Radio. The following description illustrates an example of video/TV content to be broadcast to a number of viewers 26. However, it is appreciated that the system and methods of the present invention may be used for other media content such as radio transmission, in which case viewers (26) illustrated in FIG. 1 would be listeners 26, and the advertisements would be submitted in the form of audio files rather than video.

The ADS 12, in a primary role, serves to link a pool 24 of advertisers 30 (e.g. ADV1, ADV2, etc.) with the ICPs 22 and viewers 26 to generate revenue from the content provided by the ICPs.

Figure 2:
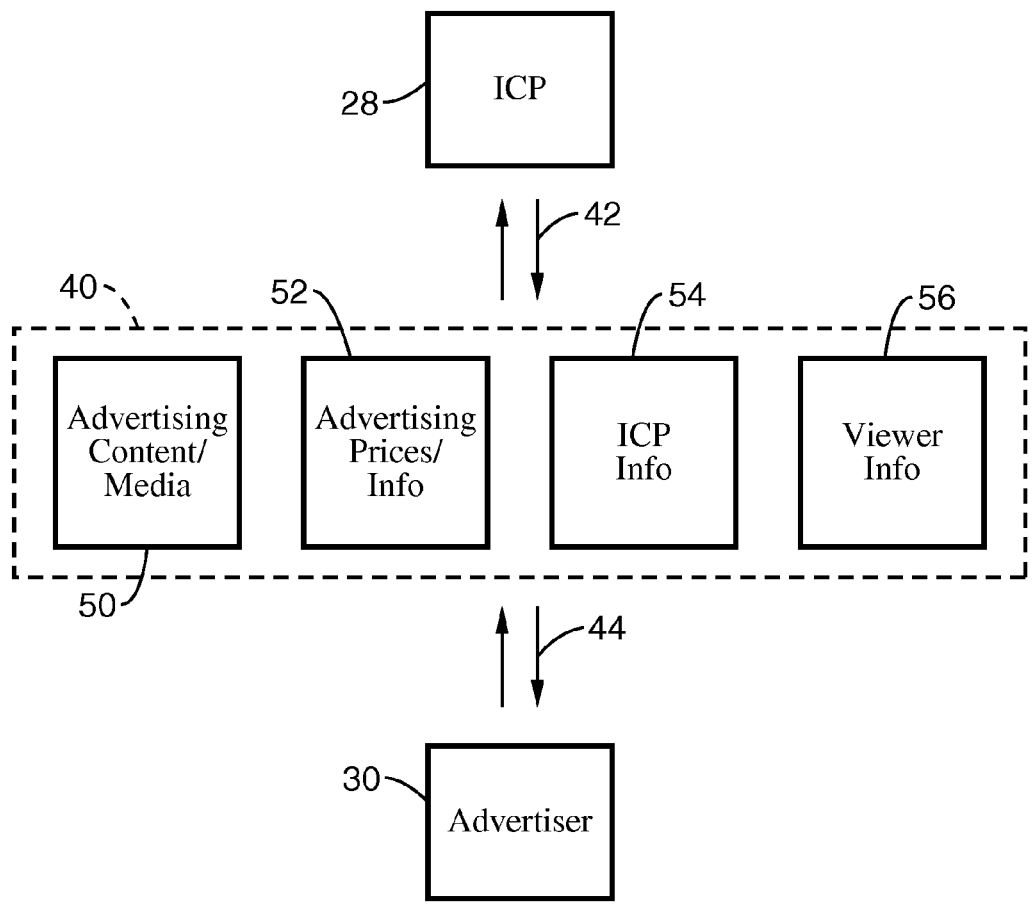
FIG. 2 is a diagram of an ADS platform in accordance with the present invention.

Referring to FIG. 2, the ADS 12 may comprise one or more databases stored on a platform 40 that is coupled to advertiser pool 30 and ICP pool 28 via network or internet connections 42 and 44. The platform 40 may be a computer, server, or other storage medium capable of storing a plurality of data files associated with the advertisers, ICPs and end users (viewers).

For example, the platform 40 may store an advertising content/media database 50 that holds a number of advertising media files (e.g. the actual video or audio file that comprises the advertisers message), and metadata or other data associated with the advertising media files. In one embodiment, the metadata may contain data such as the length, author (e.g. associated advertiser associated with the file), date created, size, etc of the advertising file.

The platform may also contain an advertiser preferences/info database 52 that holds information about each of the advertisers having files in database 50. Target demographic information of each advertiser may be stored in database 52, that has the desired target demographic provided by advertiser for each advertisement, such as a desired geographic location of viewer, viewer age, sex, income, etc. The geographic location/extent may be specified to any precision desired by the advertiser, e.g. from a room in a particular building to an entire country, or even the entire world. The advertiser preferences/info database may also hold financial data such as the price that each advertiser is willing to pay for exposing the advertisement to a viewer who matches the target demographic.

Platform 40 may also contain a content provider data/info database 54 that holds particular information about or from the individual ICPs. For example, information such as the "class" of Internet site (explained in further detail below) that may agree to show each advertisement may be stored in database 54.

Platform 40 may also contain an end user/viewer info database 56 that stores individual viewer info, such as number of times each advertisement may be shown to any single viewer, viewer demographic info, etc.

FIG. 3 illustrates an exemplary diagram of the system and method of the present invention. In this example, viewer A is receiving data 60 from one of the ICPs 28 (in this case ICP2). Data stream 60 may contain video content 62 (e.g. packet or file) from the ICP 28 site. The content 62 may be streamed or pre-downloaded completely to user A's device prior to viewing.

While viewer A is connected to the ICP 28 site, the ICP 28 may be receiving data 70 from the viewer that details information about the viewer 26. Viewer information may comprise demographic information such as viewer location, age, sex, income, buying habits, internet usage, etc. This viewer information may be attained via a number of different means. For example, in one embodiment, the system 10 may use configuration information stored on viewer A's device. This information may have been originally provided by the viewer himself/herself during system setup, or this information may be obtained from the Internet service provider or the provider of internet connection (the Internet service provider often provides the last-mile link and hence can usually estimate the geographical location of the end-point to each link). Information about the user may also be stored as cookies on the user's device.

In another embodiment, user info may be attained by tracing packets 62 as they travel across the Internet from viewer A's device to the ICP 28 or ADS 12. For example, this may be done using traceroute (in Internet protocol). The trace information can be combined with information on registration/owners of domain names, for example (obtained from "whois", DNS loc, etc.) to estimate location of viewer A.

In yet another example, GPS or other techniques may be used to obtain viewer information and location.

Referring still to FIG. 3, the ICP 28 preferably transmits data 76 to ADS 12. Data 76 may include user data 70, or other data specific to the ICP 28. According to the data provided by the ICP or stored in any of the databases (50, 52, 54, and 56) on platform 40 (FIG. 2), the ADS transmits an advertising file 78 received from the advertiser 30 (in this case ADV3) that meets the criteria specified for placement of the advertising file 78 in data stream 60 (explained in further detail below).

As shown in FIG. 4, the content data files 62 may contain cued locations 66 within the content data 64 at which an advertising file may be placed. Advertisements 78 are then selected and obtained from the ADS site 12 and displayed to the viewer 26.

The selection of advertisements 78 from the ADS site 12 may be based on a number of criteria. For example, information may be stored in database 52, on how much each advertiser 30 is willing to pay for the spot. The advertiser (in this case ADV3) that has agreed to the highest sum is then selected from the content database 50.

Criteria for placement of each advertiser's ads may be determined by factors such as the length of the advertisement slot that the ICP 28 is willing to provide, the type of content selected by the user 26 (e.g. a certain genre or type of media may be indicative of the end user's demographic), the geographic location of the target viewer, how many times the target viewer has seen this advertisement within a specified period of time, etc.

In addition, content provider information (such as that held in database 54), may be used as placement criteria. For example, each ICP 28 in pool may be assigned a class or rating, e.g. classes may be "premier sites" such as BBC, "middle tier" sites (e.g. smaller local broadcasters), and "lower tier" sites, such as from individual amateur content providers on the Internet.

Download/streaming of the advertisement 78 from ADS 12 may be either by viewer A's device, or by the ICP 28 website prior to, or during the transmission of the primary content 62 to viewer A's device. If viewer's device is part of a closed end-end system, e.g. designed specifically to support the business model as followed by the ADS 12 and ICP 28, then the viewer's device can be designed to detect advertisement-insertion cues 66 (see FIG. 4) in the original content 62 from the ICP 28, and then contact ADS 12 (either indirectly through IDS 28 and transmission 76, or directly through transmission 80) to obtain suitable advertisements 78 to be shown to the viewer. Alternatively, the viewer's device may also pre-download pre-selected advertisements and store them locally on the viewer's device for later final-selection and display to the user at cues 66 in the displayed content 62.

In another embodiment, wherein the viewer's device is not part of the end-end closed system, the ICP 28 may obtain suitable advertisements from ADS 12, and these advertisements are then sent to the user's device for display at the appropriate times. The actual insertion/merging of advertisement 78 into the main stream 62 may be done either by ICP 28, which is ideal, or by the viewer's device, depending on packet latencies between the ICP 28, ADS 12, and the viewer's device 26.

FIG. 5 illustrates an exemplary revenue diagram for the system and method of the present invention. In one embodiment, payment of a fee is made from ADS 12 to ICP 28, based on the amount 94 that advertiser 30 is willing to pay for each viewing of the advertisement by viewer 26. Typically, ADS 12 will keep a certain percentage of each such payment as its own fee (hence 92 will be a lesser amount than 94).

The system 10 may also be configured so that the ADS 12 can track whether a downloaded advertisement 78 has actually been displayed (e.g. so that Internet sites may not obtain payment for advertisements that they have not actually been shown to viewers). In an end-end system implementation, the viewer's device 26 may be part of the trusted system, and hence may be trusted to provide accurate feedback to ADS 12 regarding which advertisements have been displayed on the viewer's device. The ADS 12 may also use the "class" classification in the ADS database 54 to restrict business with certain websites that are designated below a certain level or rating. Other methods, such as tracking packets 78 that are actually sent to each viewer, may also be possible.

In some embodiments, caches may be used at various locations on the Internet. For example, the ICP Internet site 28 may be cached at a location in NY for better performance for viewers in the USA. Also, content aggregators may be used to combine content from various ICPs into a single site. The content 62 may include video, but also may include any combination of audio, text, graphics, etc.

It is appreciated that the above description and FIGS. 1-5 describe a system of wherein content is provided to the end user as a unicast, (e.g. video-on-demand) transmission. However, the methods and system of the present invention may be configured to generate a revenue model for broadcast transmissions (e.g. cable or satellite) as well. Unlike the ICPs described above, broadcast providers do have a revenue or business model (e.g. cable/satellite subscriptions and general advertising). However, targeted advertisements under the current system cannot be implemented cost effectively for broadcast content.

FIG. 6 illustrates a broadcast system 100 in accordance with the present invention, having a display 102 (e.g. TV) and device connected to the display, e.g. set-top box, (STB)108, which may receive broadcast content via an interface to the Internet or other WAN/MAN-large scale network 118.

The network 118 (e.g. Internet) may be used to transmit targeted advertisements to each user or group of users. These targeted advertisements, which may be similar to or substantially identical to the advertising files 78 shown in FIG. 3, may be downloaded and stored to the user's device 108 (e.g. via hard drive 120 or other storage device) prior to the broadcasted content, and then simply inserted at the appropriate time as cued by hidden signals (e.g. in the vertical blanking interval or as data packets) in the broadcast content, or by streamed-in, real-time transmission via the networked connection, should network bandwidth be adequate.

Transmission/download of advertisements to the user's device 108 may be initiated by the user's device in agreement with a protocol pre-agreed upon with the broadcaster/service provider, or by the broadcaster/content provider.

If the broadcaster/content provider arranges for advertisements to be sent to the user's device, the broadcaster/content provider will need to uniquely identify the user's device. This may, for example, be done using a unique network address of the user's device 108. This network address may be transmitted directly from the user's device 108 to the broadcaster/content provider 110 either via a return channel (e.g. from the user's perspective, the upstream data path 112, as opposed to the downstream data path 114 which is used to download data, e.g. content), or in another channel 116 on the same infrastructure 118 (e.g. DOCSIS (Data Over Cable Service Interface Specification)).

Alternatively, user data may be uploaded to the content provider via a separate network interface 122, in which case the user's device 108 identifies the program being viewed and then "calls back" the appropriate broadcaster site with its network address and other possible user-related information.

Referring now to FIG. 7, an ADS 140 may be incorporated to facilitate content provider and advertiser selection. As shown in FIG. 7, a pool 130 of individual users 108 may have access to a pool 134 of individual content providers 110 over network 132. Network 132 may comprise a number of intermediary connections, including the service provider (e.g. cable, satellite), distribution hubs, nodes, etc. The ADS 140 may comprise a platform, similar to platform 40 of FIG. 2, for storing data such as individual advertiser 144 files, or data relating to users 130 or content providers 134.

FIG. 8 is a diagram showing a business model or method 180 of the present invention for providing targeted advertising to broadcast viewer. First, viewer information is acquired and collected at step 182. This includes user identification as described above, and may be performed locally at the user's device 108, or upstream from a device coupled to the user via the network 132, e.g. one or more global websites operated by the manufacturer of the user's device 108. User information may be from any and all sources of viewed content, e.g. content providers 110 in pool 134, and may include web sites visited, etc. This information may be obtained regardless of source of content and regardless of which service provider provides each piece of content. In some embodiments, a profile of the user (e.g. age, income range, marital status, recent purchases) may be kept on the user's device 108 or on the network (e.g. at ADS 140).

When the user indicates an interest to view a certain content item (e.g. TV program), all possible sources (e.g. content providers 110) for the program are identified at step 184. Step 184 may be performed at user's device 108, or at a location on the network.

At step 186, a "pay-per-view" rate is negotiated for the viewer between all service providers that provide the desired content. This "negotiation" may take into account a number of factors, including the value of the viewer to different advertisers 144 based on the viewer's uploaded information or viewing history, when the content can be provided and is desired.

At step 188, content is then downloaded and obtained (e.g. via download channel 114) from the source that is selected as a function of the acquired user data and other predetermined criteria (this may be in terms of terms of lowest cost, or fewest advertisements, or maximum advertising revenue, etc.). Advertising content may be sent with the downloaded content, or be inserted at cued locations in the downloaded files from a local storage location at the user's device 108.

The above steps may be implemented even for "free" content, i.e. where the user is not required to pay for the content for any of the content providers. The service provided by the user's device may allow for a monthly payment from the user, and/or monthly payment from the service/content provider and/or advertising companies.

While the description detailed above is directed to the distribution of advertisements, it may also be applied to the distribution of other types of directed content or information. For example, content relevant to viewers in a certain localized area. Certain aspects of the present invention may also be used for authorization/payment to view broadcast content that is encrypted.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 unless the element is expressly recited using the phrase "means for."

What is claimed is:

1. A method for providing targeted advertising messages to a user, comprising:
    storing a plurality of advertising data files from one or more advertising entities within a database associated with an advertising data service;
    acquiring user data relating to the user within said database of said advertising data service;
    selecting a targeted advertising message from one of the stored advertising data files as a function of the acquired user data and in response to which advertiser has agreed to the highest payment;
    transmitting content data to an internet content provider for being directed to the user;
    executing a fee payment from said advertising data service to said internet content provider in response to inclusion of said targeted advertising message to the user;
    said content data is configured with a cue for insertion of data relating to the selected targeted advertising message; and
    insertion of said advertising message into said content data being output to the user;
    receiving a fee payment from said one or more advertising entities to said advertising data service in response to the fee payment made to said internet content provider for providing the targeted advertising message that is viewed by the user.

2. The method of claim 1, wherein the plurality of advertising data files are stored in a centralized location.

3. The method of claim 1, wherein transmitting content data comprises transmitting an Internet TV program from an internet content provider.

4. The method of claim 1, wherein transmitting content data comprises transmitting a broadcast program to a set top box of the user.

5. The method of claim 1, wherein acquiring user data relating to the user comprises acquiring demographic data about the user.

6. The method of claim 5, wherein the demographic data is acquired from a device used by the user for obtaining said content.

7. The system of claim 5:
    wherein said user data comprises demographic data collected from the user; and
    wherein said demographic data is used for selection of the advertising data file.

8. The method of claim 1, wherein the insertion of data relating to the selected targeted advertising message is performed prior to transmission of said content to the user.

9. The method of claim 1, wherein the insertion of data relating to the selected targeted advertising message is performed after transmission of said content to the user.

10. The method of claim 1, further comprising:
    storing data relating to one or more advertiser preferences;
    wherein the advertiser preferences are used in the selection of the targeted advertising message.

11. The method of claim 1, wherein content is transmitted to the user through one of a plurality of content providers.

12. The method of claim 11, further comprising:
    storing data relating to one or more content providers;
    wherein the data relating to one or more content providers is used in the selection of the targeted advertising message.

13. A system for providing targeted advertising messages to a user, comprising:
    a database, within an advertising data service, comprising a plurality of advertising data files from one or more advertising entities; and
    a network connection linking the database with a plurality of internet content providers;
    wherein said advertising data service is configured for selecting an advertising message targeting a specific targeted user in response to a determination of an advertiser payment being made;
    wherein said advertiser payment is in the form of negotiating a fee from multiple content sources capable of supplying content requested by the specific user;
    wherein the negotiated fee takes into account the value of the viewer to said one or more advertising entities;
    wherein said advertising data service is configured for transmitting one or more of the advertising data files through the internet content provider to a targeted user seeking transmission of content from one of the plurality of content providers; and
    wherein said advertising data service is configured for executing a fee payment to the internet content provider, and receiving a fee payment from said one or more advertising entities in response to inclusion of said targeted advertising message within the transmitted content viewed by the user.

14. The system of claim 13:
    wherein the database also comprises user data relating to one or more users; and
    wherein said user data is used for selection of the advertising data file.

15. The system of claim 13, wherein the advertising data file is configured to be inserted at a cued location in the transmitted content.

16. The system of claim 15, wherein the advertising data file is configured to be inserted at the cued location in the transmitted content prior to transmission of said content to the user.

17. The system of claim 15, wherein the advertising data file is configured to be inserted at the cued location in the transmitted content after transmission of said content to the user.

18. The system of claim 13:
    wherein the database also comprises advertiser data relating to the plurality of advertisers; and
    wherein said advertiser data is used for selection of the advertising data file.

19. The system of claim 13:
    wherein the database also comprises content provider data relating to the plurality of content providers; and
    wherein said content provider data is used for selection of the advertising data file.

20. A method for providing content to a viewer of content via a receiving device, comprising:
    acquiring viewer data, relating to the viewer, from the receiving device into a database for an advertising data service;
    identifying one or more sources of a content item selected by the viewer;
    selecting an advertising message targeting the viewer in response to a determination of advertiser payment;
    selecting a source for the content item as a function of the acquired viewer data and negotiating a fee from multiple content sources capable of supplying the content;
    wherein the negotiated fee takes into account the value of the viewer to one or more advertising entities;
    downloading the content item to the viewer; and executing a fee payment from an advertising data service to the content source, and receiving a fee payment from said one or more advertising entities to the advertising data service, in response to inclusion of said targeted advertising message within the downloaded content item received by the viewer.

21. The method of claim 20, wherein acquiring viewer data comprises identifying the viewer's receiving device, and retrieving viewer data stored on the receiving device.

22. The method of claim 21, wherein acquiring viewer data further comprises determining the geographic location of the viewer.

23. The method of claim 22, wherein acquiring viewer data further comprises obtaining a viewing history of the viewer.

24. The method of claim 20, wherein selecting a source for the content item comprises negotiating the best pay-per-view rate from the one or more sources.

25. The method of claim 24, wherein the pay-per-view rate is a function of the value of the viewer to an advertiser, as obtained from the acquired viewer data.

26. The method of claim 20, wherein downloading the content item comprises:
  selecting an advertising data file for insertion at a cued location in the content item; and
  downloading the advertising file and content item to the viewer.

* * * * *